(12) United States Patent
Evans

(10) Patent No.: US 11,867,131 B2
(45) Date of Patent: Jan. 9, 2024

(54) HYBRID ELECTRIC SINGLE ENGINE DESCENT MODE ACTIVATION LOGIC

(71) Applicant: RTX Corporation, Farmington, CT (US)

(72) Inventor: Brandon Evans, San Antonio, TX (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 17/586,317

(22) Filed: Jan. 27, 2022

(65) Prior Publication Data
US 2023/0137815 A1    May 4, 2023

Related U.S. Application Data

(60) Provisional application No. 63/273,471, filed on Oct. 29, 2021.

(51) Int. Cl.
| | |
|---|---|
| *F02C 9/42* | (2006.01) |
| *F02C 7/262* | (2006.01) |
| *F02C 9/28* | (2006.01) |

(52) U.S. Cl.
CPC .............. *F02C 9/42* (2013.01); *F02C 7/262* (2013.01); *F02C 9/28* (2013.01); *F05D 2220/76* (2013.01); *F05D 2260/85* (2013.01); *F05D 2270/051* (2013.01); *F05D 2270/12* (2013.01); *F05D 2270/13* (2013.01); *F05D 2270/306* (2013.01)

(58) Field of Classification Search
CPC ....................................................... F02C 9/42
See application file for complete search history.

(56) References Cited

U.S. PATENT DOCUMENTS

| | | | |
|---|---|---|---|
| 11,014,513 B2 | 5/2021 | Klemen et al. | |
| 2018/0003072 A1* | 1/2018 | Lents | F02C 7/36 |
| 2020/0056497 A1 | 2/2020 | Terwilliger et al. | |
| 2020/0102914 A1* | 4/2020 | Moss | F01D 15/10 |
| 2021/0025339 A1 | 1/2021 | Terwilliger et al. | |
| 2021/0108576 A1 | 4/2021 | Adibhatla et al. | |
| 2021/0172333 A1* | 6/2021 | Suciu | F01D 15/10 |
| 2021/0172384 A1 | 6/2021 | Brown et al. | |
| 2021/0222629 A1 | 7/2021 | Terwilliger | |
| 2021/0300576 A1 | 9/2021 | Thomassin et al. | |
| 2022/0042465 A1* | 2/2022 | Swann | F02C 6/00 |
| 2022/0396363 A1* | 12/2022 | Roy | G08G 5/0039 |

OTHER PUBLICATIONS

European Search Report Issued in European Application No. 22204554. 4-1004 dated Mar. 9, 2023; 8 Pages.

* cited by examiner

*Primary Examiner* — Katheryn A Malatek
(74) *Attorney, Agent, or Firm* — CANTOR COLBURN LLP

(57) ABSTRACT

Examples described herein provide a computer-implemented method that includes determining a thrust requirement to satisfy a desired glide slope. The method further includes determining, based on the thrust requirement, whether thrust matching can be maintained while operating a first gas turbine engine in a fuel-burning mode and operating a second gas turbine engine in an electrically powered mode. The method further includes, responsive to determining that thrust matching cannot be maintained, commanding fuel flow to a combustor of the second engine to cause the second gas turbine engine to operate in the fuel-burning mode.

12 Claims, 6 Drawing Sheets

HYBRID ELECTRIC SINGLE ENGINE DESCENT MODE ACTIVATION LOGIC

CROSS-REFERENCE TO RELATED APPLICATIONS

This application claims the benefit of U.S. Provisional Patent Application No. 63/273,471 filed Oct. 29, 2021, the disclosure of which is incorporated herein by reference in its entirety.

BACKGROUND

The subject matter disclosed herein generally relates to rotating machinery and, more particularly, to a method and an apparatus for a hybrid electric single engine descent mode activation logic.

Gas turbine engines are typically inefficient to operate at low power settings. Operation of a gas turbine engine at idle is the typical lowest power setting available once the gas turbine engine has been started. In some instances, thrust produced at idle may be greater than the thrust needed for ground-based operations, such as taxiing and waiting in a parked position prior to takeoff or after landing. This can result in excess fuel consumption and may reduce engine component life with many repeated taxi, takeoff, and landing cycles.

In a hybrid gas turbine engine, an electric motor can be available to assist the gas turbine engine operation by adding rotational force to a spool of the gas turbine engine while fuel flow to the gas turbine engine is reduced below idle or shut off. Such a configuration can result in non-intuitive control from a pilot perspective, depending on how the two energy sources, fuel and electricity, are expected to be managed through the range of aircraft operation. In some control configurations, during operations such as engine start, thrust control may not be available to the pilot.

BRIEF DESCRIPTION

In another exemplary embodiment a system includes a first gas turbine engine of an aircraft, the first gas turbine engine having a first low speed spool, a first high speed spool, and a first combustor. The system further includes a first high spool motor configured to augment rotational power of the first high speed spool. The system further includes a second gas turbine engine of an aircraft, the second gas turbine engine having a second low speed spool, a second high speed spool, and a second combustor. The system further includes a second high spool motor configured to augment rotational power of the second high speed spool. The system further includes a controller. The controller determines a thrust requirement to satisfy the desired glide slope. The controller further determines whether thrust matching can be maintained while operating a first gas turbine engine in a fuel-burning mode and operating a second gas turbine engine in an electrically powered mode. Responsive to determining that thrust matching cannot be maintained, the controller commands fuel flow to a combustor of the second engine to cause the second gas turbine engine to operate in the fuel-burning mode.

In addition to one or more of the features described herein, or as an alternative, further embodiments of the system may include that the first gas turbine engine provides a first thrust and that the second gas turbine engine provides a second thrust.

In addition to one or more of the features described herein, or as an alternative, further embodiments of the system may include that determining whether thrust matching can be maintained includes comparing the first thrust to the second thrust.

In addition to one or more of the features described herein, or as an alternative, further embodiments of the system may include that it is determined that thrust matching can be maintained when the second thrust satisfies a threshold difference relative to the first thrust In addition to one or more of the features described herein, or as an alternative, further embodiments of the system may include that it is determined that thrust matching cannot be maintained when the second thrust fails to satisfy a threshold difference relative to the first thrust.

In addition to one or more of the features described herein, or as an alternative, further embodiments of the system may include that the controller is further configured to: determine a glide range to an alternate landing location; and responsive to determining that the glide range exceeds a distance threshold, command fuel flow to a combustor of the second engine to cause the second gas turbine engine to operate in the fuel-burning mode.

In addition to one or more of the features described herein, or as an alternative, further embodiments of the system may include that the controller is further configured to track a first amount of time the second engine spends in the fuel-burning mode and a second amount of time the second engine spends in the electrically powered mode.

In addition to one or more of the features described herein, or as an alternative, further embodiments of the system may include that commanding the fuel flow to the combustor of the second engine to cause the second gas turbine engine to operate in the fuel-burning mode is based at least in part on at least one of the first amount of time or the second amount of time.

In addition to one or more of the features described herein, or as an alternative, further embodiments of the system may include that, responsive to determining that thrust matching can be maintained, the first gas turbine engine continues to operate in the fuel-burning mode and the second gas turbine engine continues to operate in the electrically powered mode In addition to one or more of the features described herein, or as an alternative, further embodiments of the system may include that the controller is further configured to receive the desired glide slope.

In one exemplary embodiment, a computer-implemented method for a a hybrid electric single engine descent mode activation logic is provided. The method includes determining a thrust requirement to satisfy a desired glide slope. The method further includes determining, based on the thrust requirement, whether thrust matching can be maintained while operating a first gas turbine engine in a fuel-burning mode and operating a second gas turbine engine in an electrically powered mode. The method further includes, responsive to determining that thrust matching cannot be maintained, commanding fuel flow to a combustor of the second engine to cause the second gas turbine engine to operate in the fuel-burning mode.

In addition to one or more of the features described herein, or as an alternative, further embodiments of the method may include that the first gas turbine engine provides a first thrust and that the second gas turbine engine provides a second thrust.

In addition to one or more of the features described herein, or as an alternative, further embodiments of the method may include that determining whether thrust matching can be maintained includes comparing the first thrust to the second thrust.

In addition to one or more of the features described herein, or as an alternative, further embodiments of the method may include that it is determined that thrust matching can be maintained when the second thrust satisfies a threshold difference relative to the first thrust.

In addition to one or more of the features described herein, or as an alternative, further embodiments of the method may include that it is determined that thrust matching cannot be maintained when the second thrust fails to satisfy a threshold difference relative to the first thrust.

In addition to one or more of the features described herein, or as an alternative, further embodiments of the method may include determining a glide range to an alternate landing location; and responsive to determining that the glide range exceeds a distance threshold, commanding fuel flow to a combustor of the second engine to cause the second gas turbine engine to operate in the fuel-burning mode.

In addition to one or more of the features described herein, or as an alternative, further embodiments of the method may include tracking a first amount of time the second engine spends in the fuel-burning mode and a second amount of time the second engine spends in the electrically powered mode.

In addition to one or more of the features described herein, or as an alternative, further embodiments of the method may include that commanding the fuel flow to the combustor of the second engine to cause the second gas turbine engine to operate in the fuel-burning mode is based at least in part on at least one of the first amount of time or the second amount of time.

In addition to one or more of the features described herein, or as an alternative, further embodiments of the method may include responsive to determining that thrust matching can be maintained, continuing to operate the first gas turbine engine in the fuel-burning mode and continuing to operate the second gas turbine engine in the electrically powered mode.

In addition to one or more of the features described herein, or as an alternative, further embodiments of the method may include receiving the desired glide slope.

The above features and advantages, and other features and advantages, of the disclosure are readily apparent from the following detailed description when taken in connection with the accompanying drawings.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
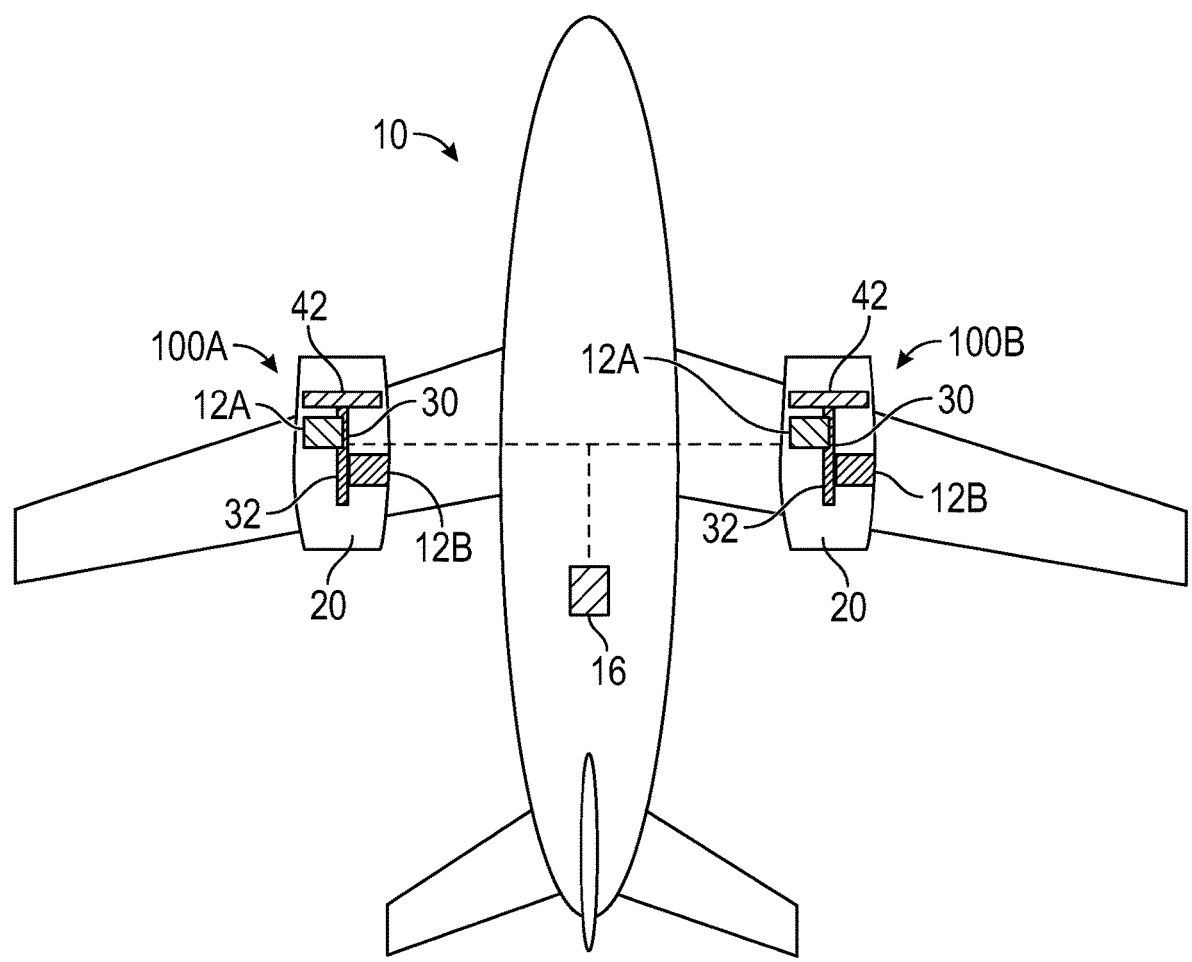
FIG. 1 is a schematic diagram of an aircraft including dual hybrid electric propulsions systems, in accordance with an embodiment of the disclosure.

FIG. 1 schematically illustrates an aircraft 10 that includes a pair of hybrid electric propulsion systems 100A, 100B (also referred to as hybrid gas turbine engines 100A, 100B or hybrid propulsion systems 100A, 100B). Each of the hybrid electric propulsion systems 100A, 100B includes a gas turbine engine 20 with a low speed spool 30 configured to drive rotation of a fan 42. Gas turbine engine 20 also includes a high speed spool 32 that operates at higher speeds and pressures than the low speed spool 30. A low spool motor 12A is configured to augment rotational power of the low speed spool 30. A high spool motor 12B can be configured to augment rotational power of the high speed spool 32. At least one power source 16 of the aircraft 10 can provide electrical power to the low spool motor 12A and/or to the high spool motor 12B. The power source 16 can be a stored energy source or a generator driven by an engine. For example, the power source 16 can include one or more of a battery, a super capacitor, an ultra capacitor, a fuel cell, a flywheel, and the like. Where the aircraft 10 includes an additional thermal engine (not depicted), such as an auxiliary power unit (APU), the power source 16 can be a generator driven by the thermal engine. Further, a generator of one of the hybrid electric propulsion systems 100A, 100B can provide power to the other hybrid electric propulsion systems 100A, 100B. For example, if the hybrid electric propulsion system 100A is combusting fuel, the hybrid electric propulsion system 100B may operate without burning fuel and can drive the low speed spool 30 based on the low spool motor 12A receiving electric power from the hybrid electric propulsion system 100A and/or the power source 16. Further, the high speed spool 32 can be driven based on the high spool motor 12B receiving electric power from the hybrid electric propulsion system 100A and/or the power source 16.

While the example of FIG. 1 illustrates a simplified example of the gas turbine engine 20, it will be understood that any number of spools, and inclusion or omission of other elements and subsystems are contemplated. Further, rotor systems described herein can be used in a variety of applications and need not be limited to gas turbine engines for aircraft applications. For example, rotor systems can be included in power generation systems, which may be ground-based as a fixed position or mobile system, and other such applications.

Figure 2:
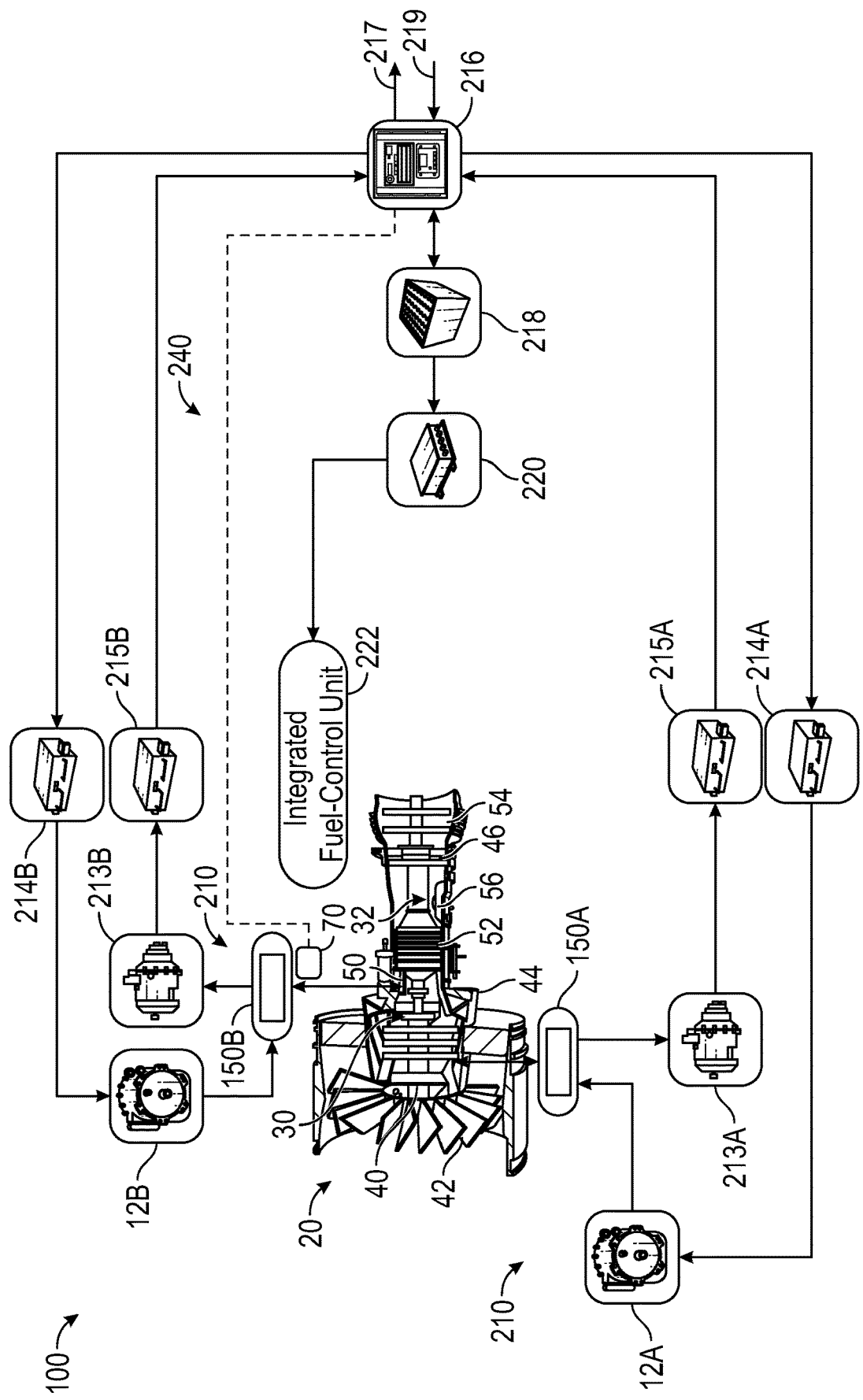
FIG. 2 is a schematic diagram of a hybrid electric propulsion system, in accordance with an embodiment of the disclosure.

FIG. 2 illustrates a hybrid electric propulsion system 100 (also referred to as hybrid gas turbine engine 100 or hybrid propulsion system 100) as a further example of the hybrid electric propulsion system 100A, 100B of FIG. 1. In the example of FIG. 2, the hybrid electric propulsion system 100 includes gas turbine engine 20 operably coupled to an electrical power system 210 as part of a hybrid electric aircraft, such as aircraft 10 of FIG. 1. One or more mechanical power transmissions 150 (e.g., 150A, 150B) can be operably coupled between the gas turbine engine 20 and the electrical power system 210. The gas turbine engine 20 includes one or more spools, such as low speed spool 30 and high speed spool 32, each with at least one compressor section and at least one turbine section operably coupled to a shaft (e.g., low pressure compressor 44 and low pressure turbine 46 coupled to inner shaft 40 and high pressure compressor 52 and high pressure turbine 54 coupled to outer shaft 50). The electrical power system 210 can include a low spool motor 12A configured to augment rotational power of the low speed spool 30 and a high spool motor 12B configured to augment rotational power of the high speed spool 32. Although two motors 12A, 12B are depicted in FIG. 2, it will be understood that there may be only a single motor (e.g., only low spool motor 12A) or additional motors (not depicted). Further, the motors 12A, 12B can be electric motors or alternate power sources may be used, such as hydraulic motors, pneumatic motors, and other such types of motors known in the art. The electrical power system 210 can also include a low spool generator 213A configured to convert rotational power of the low speed spool 30 to electric power and a high spool generator 213B configured to convert rotational power of the high speed spool 32 to electric power. Although two electric generators 213A, 213B (generally referred to as generators 213A, 213B) are depicted in FIG. 2, it will be understood that there may be only a single electric generator (e.g., only electric generator 213B) or additional electric generators (not depicted). In some embodiments, one or more of the motors 12A, 12B can be configured as a motor or a generator depending upon an operational mode or system configuration, and thus one or more of the electric generators 213A, 213B may be omitted.

In the example of FIG. 2, the mechanical power transmission 150A includes a gearbox operably coupled between the inner shaft 40 and a combination of the low spool motor 12A and low spool generator 213A. The mechanical power transmission 150B can include a gearbox operably coupled between the outer shaft 50 and a combination of the high spool motor 12B and high spool generator 213B. In embodiments where the motors 12A, 12B are configurable between a motor and generator mode of operation, the mechanical power transmission 150A, 150B can include a clutch or other interfacing element(s).

The electrical power system 210 can also include motor drive electronics 214A, 214B operable to condition current to the motors 12A, 12B (e.g., DC-to-AC converters). The electrical power system 210 can also include rectifier electronics 215A, 215B operable to condition current from the electric generators 213A, 213B (e.g., AC-to-DC converters). The motor drive electronics 214A, 214B and rectifier electronics 215A, 215B can interface with an energy storage management system 216 that further interfaces with an energy storage system 218. The energy storage management system 216 can be a bi-directional DC-DC converter that regulates voltages between energy storage system 218 and electronics 214A, 214B, 215A, 215B. The energy storage system 218 can include one or more energy storage devices, such as a battery, a super capacitor, an ultra capacitor, and the like. The energy storage management system 216 can facilitate various power transfers within the hybrid electric propulsion system 100. The energy storage management system 216 may also transfer power to one or more electric motors on the engine, or to external loads 217 and receive power from one or more external power sources 219 (e.g., power source 16 of FIG. 1, aircraft power, auxiliary power unit power, cross-engine power, and the like).

A power conditioning unit 220 and/or other components can be powered by the energy storage system 218. The power conditioning unit 220 can distribute electric power to support actuation and other functions of the gas turbine engine 20. For example, the power conditioning unit 220 can power an integrated fuel control unit 222 to control fuel flow to the gas turbine engine 20. The power conditioning unit 220 can also power a plurality of actuators (not depicted), such as bleed actuators, vane actuators, and the like.

One or more accessories 70 can also be driven by or otherwise interface with the gas turbine engine 20. Examples of accessories 70 can include oil pumps, fuel pumps, and other such components. As one example, the accessories 70 include an oil pump driven through gearing, such as mechanical power transmission 150B, in response to rotation of the high speed spool 32 and/or the high spool motor 12B. Alternatively, accessories 70 can be electrically driven through power provided by the energy storage management system 216 or other such sources of electrical power.

Engagement and operation of the low spool motor 12A, low spool generator 213A, high spool motor 12B, and high spool generator 213B can change depending upon an operating state of the gas turbine engine 20 and any commands received. Collectively, any effectors that can change a state of the gas turbine engine 20 and/or the electrical power system 210 may be referred to as hybrid electric system control effectors 240. Examples of the hybrid electric system control effectors 240 can include the motors 12A, 12B, electric generators 213A, 213B, integrated fuel control unit 222, and/or other elements (not depicted).

Figure 3:
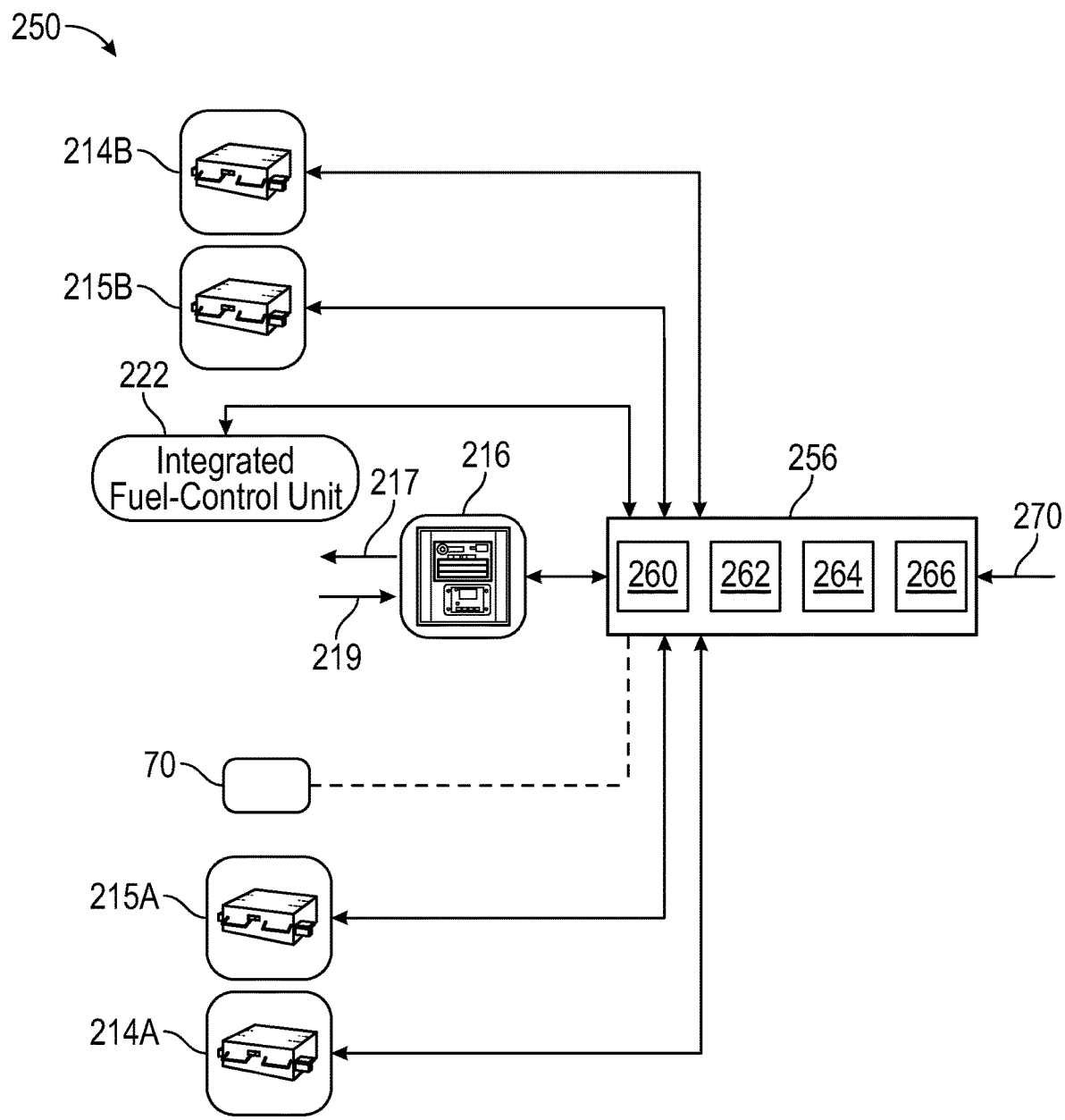
FIG. 3 is a schematic diagram of control signal paths of a hybrid electric propulsion system, in accordance with an embodiment of the disclosure.

FIG. 3 is a schematic diagram of control signal paths 250 of the hybrid electric propulsion system 100 of FIG. 2 and is described with continued reference to FIGS. 1 and 2. A controller 256 can interface with the motor drive electronics 214A, 214B, rectifier electronics 215A, 215B, energy storage management system 216, integrated fuel control unit 222, accessories 70, and/or other components (not depicted) of the hybrid electric propulsion system 100. In embodiments, the controller 256 can control and monitor for fault conditions of the gas turbine engine 20 and/or the electrical power system 210. For example, the controller 256 can be integrally formed or otherwise in communication with a full authority digital engine control (FADEC) of the gas turbine engine 20. Alternatively, the controller 256 can be an aircraft level control or be distributed between one or more systems of the aircraft 10 of FIG. 1. In embodiments, the controller 256 can include a processing system 260, a memory system 262, and an input/output interface 264. The controller 256 can also include various operational controls, such as a hybrid engine control 266 that controls the hybrid electric system control effectors 240 further described herein, for instance, based on a thrust command 270. The thrust command 270 can be a throttle lever angle or a command derived based on a throttle lever angle control of the aircraft 10 of FIG. 1.

The processing system 260 can include any type or combination of central processing unit (CPU), including one or more of: a microprocessor, a digital signal processor (DSP), a microcontroller, an application specific integrated circuit (ASIC), a field programmable gate array (FPGA), or the like. The memory system 262 can store data and instructions that are executed by the processing system 260. In embodiments, the memory system 262 may include random access memory (RAM), read only memory (ROM), or other electronic, optical, magnetic, or any other computer readable medium onto which is stored data and algorithms in a non-transitory form. The input/output interface 264 is configured to collect sensor data from the one or more system sensors and interface with various components and subsystems, such as components of the motor drive electronics 214A, 214B, rectifier electronics 215A, 215B, energy storage management system 216, integrated fuel control unit 222, accessories 70, and/or other components (not depicted) of the hybrid electric propulsion system 100. The controller 256 provides a means for controlling the hybrid electric system control effectors 240 using a hybrid engine control 266 that can be dynamically updated during operation of the hybrid electric propulsion system 100. The means for controlling the hybrid electric system control effectors 240 can be otherwise subdivided, distributed, or combined with other control elements.

The controller 256 with hybrid engine control 266 can apply control laws and access/update models to determine how to control and transfer power between the low speed spool 30 and high speed spool 32. For example, sensed and/or derived parameters related to speed, flow rate, pressure ratios, temperature, thrust, and the like can be used to establish operational schedules and transition limits to maintain efficient operation of the gas turbine engine 20. For instance, a mode of operation of the gas turbine engine 20, such as idle, takeoff, climb, cruise, and descent can have different power settings, thrust requirements, flow requirements, and temperature effects. The hybrid engine control 266 can control electric current provided to the low spool motor 12A and high spool motor 12B and loading effects of the low spool generator 213A and high spool generator 213B. The hybrid engine control 266 can also determine a power split between delivering fuel to the combustor 56 and using the low spool motor 12A and/or high spool motor 12B to power rotation within the gas turbine engine 20.

Figure 4:
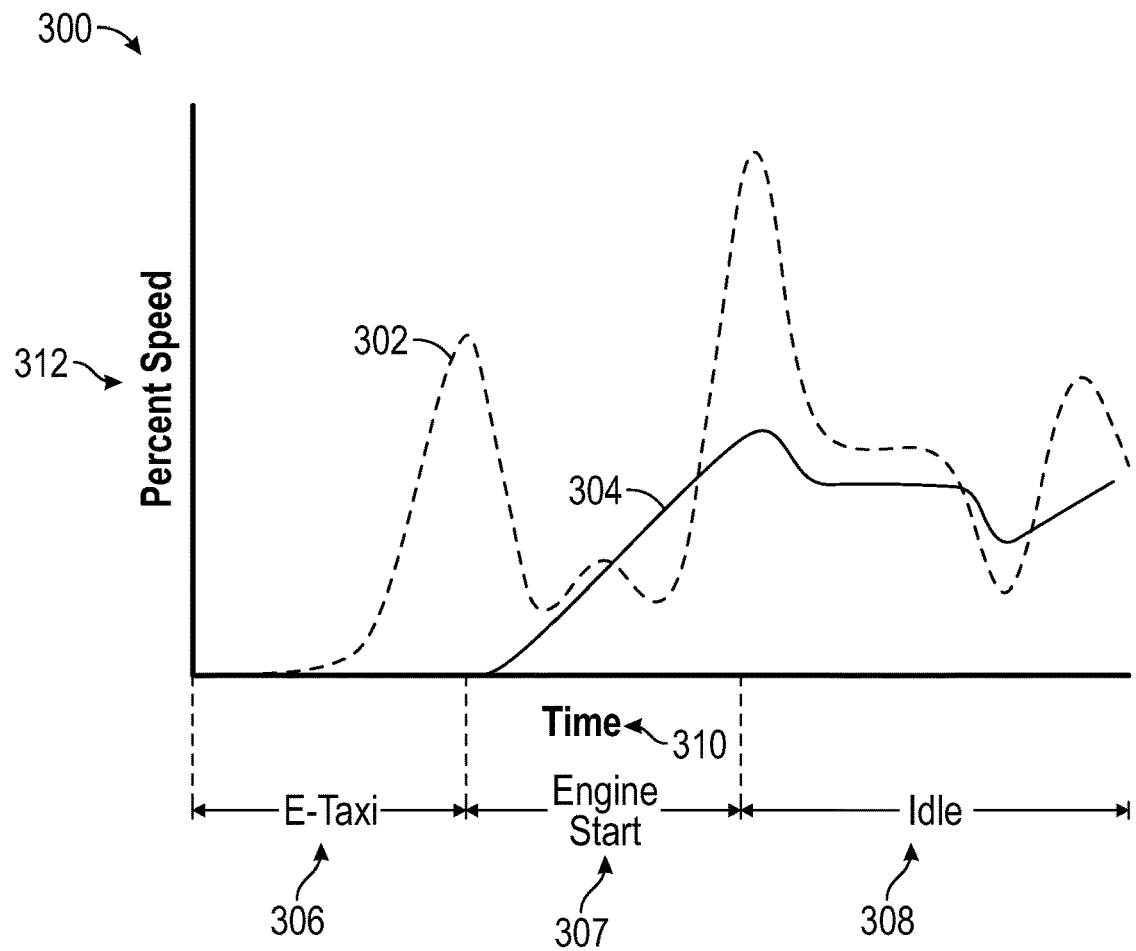
FIG. 4 is a plot that graphically illustrates a relationship between engine spool speeds and time when transitioning through multiple operating modes, in accordance with an embodiment of the disclosure.

Referring now to FIG. 4, plot 300 graphically illustrates a relationship between engine spool speeds and time when transitioning through multiple operating modes. Line 302 indicates a percent speed 312 of the low speed spool 30 as time 310 advances and the hybrid electric propulsion system 100 transitions between e-taxi 306, engine start 307, and conventional idle 308. E-taxi 306 refers to a mode of operation where the low spool motor 12A drives rotation of the low speed spool 30 to produce thrust using the fan 42, such that the aircraft 10 can be maneuvered on the ground without burning fuel in the combustor 56. Line 304 indicates a percent speed 312 of the high speed spool 32 as time 310 advances and the hybrid electric propulsion system 100 transitions between e-taxi 306, engine start 307, and conventional idle 308. As can be seen in FIG. 4, the high speed spool 32 can remain undriven during e-taxi mode 306, which conserves energy by avoiding fuel burn and power draw from the high spool motor 12B. In engine start 307, the high spool motor 12B can be used to increase the speed of the high speed spool 32 for light off and fuel burn in the combustor 56. In conventional idle 308, the motors 12A, 12B may not be needed, and the gas turbine engine 20 may be power by fuel burn. Alternatively, the engine-on idle state may include a further hybrid element where the idle state of the engine includes both fuel input and electric input to the electric motors 12A, 12B, or draw through the electric generators 213A, 213B. This is referred to as sub-idle, being possibly below conventional fuel-only idle in terms of either fuel flow and/or thrust.

Figure 5:
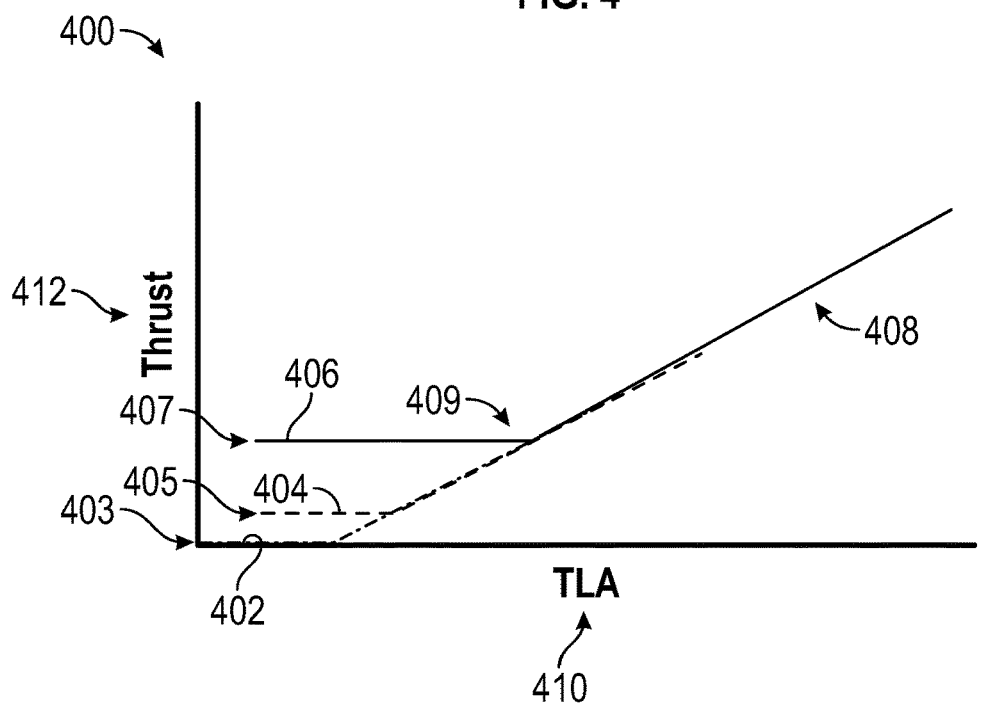
FIG. 5 is a plot that graphically illustrates a relationship between thrust and throttle lever angle, in accordance with an embodiment of the disclosure.

Referring now to FIG. 5, plot 400 graphically illustrates a relationship between thrust 412 and throttle lever angle (TLA) 410. Line 402 depicts an example thrust response starting at the e-taxi mode 306 of FIG. 4, where thrust 412 can be commanded below idle by controlling the low spool motor 12A to drive rotation of the low speed spool 30 absent fuel burn in the combustor 56. Generally, the operating mode of line 402 is for fuel off and electricity available as limited by a lower operating limit 403. The lower operating limit 403 may be associated with a fuel-off detent of the TLA 410. An idle level 407 may be associated with an idle detent of the TLA 410. Line 404 depicts an example of a thrust response during engine start 307 of FIG. 3, where thrust 412 can be provided below an idle level 407 using the low spool motor 12A to control thrust 412 while also using the high spool motor 12B to control the high speed spool 32 to provide sufficient compression in the gas turbine engine 20 for light off in the combustor 56. Line 406 depicts an example of a thrust response after starting the gas turbine engine 20 at idle level 407, such as idle 308 of FIG. 4. Controlling the low spool motor 12A and high spool motor 12B can support a sub-idle operation state with thrust control at power settings lower than idle level 407. Thrust 12 can be controlled at a demand and power output via the low spool motor 12A and/or high spool motor 12B for a thrust output less than a minimum thrust output at engine idle. The thrust response depicted at line 406 can start at idle level 407 and continue up in relation to TLA 410 along a response profile 408. Although lines 402, 404, 406 and response profile 408 are depicted as substantially linear segments, it will be understood that lines 402, 404, 406 and response profile 408 can have other shapes and characteristics.

FIG. 5 further illustrates a first region 409 where the thrust response characteristic above the idle level 407 may be the same whether the fuel flow is on or off, and furthermore a second region 405 is defined below the idle level 407. The similar thrust response characteristic can continue in the second region 405 to a lower thrust level before reaching the lower operating limit 403 at line 402. A transition from the lower operating limit 403 to the idle level 407 can occur during engine start at line 404. Line 404 is an example that can shift in position between lines 402 and 406 depending on the throttle lever angle 410 position for sub-idle operation. Power provided by the low spool motor 12A and/or the high spool motor 12B can support engine starting below idle level 407 within the second region 405.

In embodiments, the controller 256 can blend the power distribution between the hybrid electric system control effectors 240 and fuel burn in the combustor 56. From a pilot's perspective, the setting of throttle lever angle 410 produces thrust command 270 without the pilot having to distinguish between whether motor-based thrust or fuel burn based thrust is needed. While conventional systems may use detents to prevent a pilot from reducing thrust 412 below the idle level 407, embodiments can support operation of thrust 412 down to line 402 to support e-taxi mode 306 and other intermediate modes of operation below conventional idle 308. Thus, control of thrust 412 can be achieved before, during, and after engine start 307. With respect to the aircraft 10, the hybrid electric propulsion systems 100A, 100B can be independently controlled such that one of the hybrid electric propulsion systems 100A, 100B is operating in a fuel burning mode while the other of the hybrid electric propulsion systems 100A, 100B is operated using the low spool motor 12A and/or the high spool motor 12B or a blend of fuel burn and electric power. Such mixed modes of operation may be used, for instance, during descent of the aircraft 10, where thrust 412 is desired from both gas turbine engines 20, but only one of the gas turbine engines 20 actively burns fuel. Further, embodiments can support e-taxi mode 306 with warmup time to delay starting of the gas turbine engines 20 until reaching a location on the taxiway away from a boarding gate.

Figure 6:
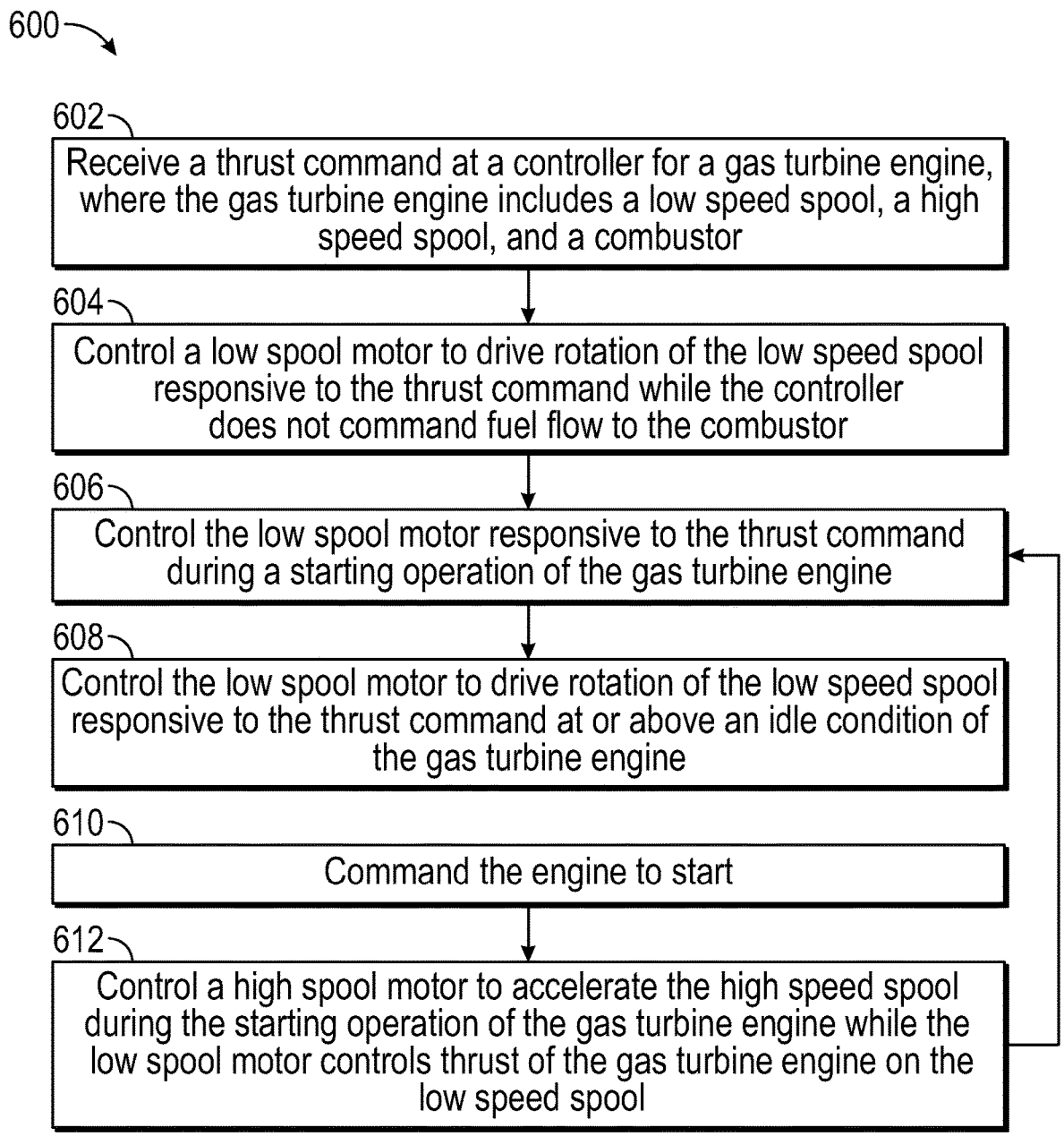
FIG. 6 is a flow chart illustrating a method, in accordance with an embodiment of the disclosure.

Referring now to FIG. 6 with continued reference to FIGS. 1-5, FIG. 6 is a flow chart illustrating a method 600 for providing hybrid gas turbine engine starting control, in accordance with an embodiment. The method 600 may be performed, for example, by the hybrid electric propulsion system 100 of FIG. 2. For purposes of explanation, the method 600 is described primarily with respect to the hybrid electric propulsion system 100; however, it will be understood that the method 600 can be performed on other configurations (not depicted).

Method 600 pertains to the controller 256 executing embedded code for the starting and thrust control using hybrid engine control 266 along with other control functions. At block 602, the controller 256 can receive a thrust command 270 for a gas turbine engine 20, where the gas turbine engine 20 includes a low speed spool 30, a high speed spool 32, and a combustor 56. The controller 256 is configured to cause fuel flow to the combustor 56 under certain operating conditions.

At block 604, the controller 256 can control a low spool motor 12A to drive rotation of the low speed spool 30 responsive to the thrust command 270 while the controller 256 does not command fuel flow to the combustor 56, where the low spool motor 12A is configured to augment rotational power of the low speed spool 30. Fuel flow can be reduced or completely shut off depending upon an operating state of the gas turbine engine 20. For example, the controller 256 can output a command of no fuel, fuel flow off, and/or otherwise effectively disable or reduce fuel flow as targeted. The operating state can depend on a combination of commands, conditions, and modes, such as an e-taxi mode, a starting mode, a ground idle mode, a takeoff mode, a climb mode, a cruise mode, an in-flight idle mode, a descent mode, a landing mode, and other such modes. The controller 256 can determine an allocation of the thrust command 270 between commanding fuel flow to the combustor 56 and electric current to the low spool motor 12A based on the operating state of the gas turbine engine 20 and a throttle lever angle 410, where the throttle lever angle 410 can be received from a pilot control, an auto-pilot control, or other such source on the aircraft 10. The low spool motor 12A can be powered by one or more of a generator, an energy storage system, and a power source 16 external to the gas turbine engine 20.

At block 606, the controller 256 can control the low spool motor 12A responsive to the thrust command 270 during a starting operation of the gas turbine engine 20. The starting operation can be a ground-based start or an in-flight restart.

At block 608, the controller 256 can control the low spool motor 12A to drive rotation of the low speed spool 30 responsive to the thrust command at or above an idle condition of the gas turbine engine 20.

In some embodiments, a high spool motor 12B can be used in conjunction with the low spool motor 12A. For example, the controller 256 can receive an engine start command 610. At block 612, the controller 256 can control a high spool motor 12B to accelerate the high speed spool 32 responsive to a start command while the low spool motor 12A controls thrust of the gas turbine engine 20 on the low speed spool 30, where the high spool motor 12B is configured to augment rotational power of the high speed spool 32. Control of the high spool motor 12B of block 612 can occur in parallel with control of the low spool motor 12A of block 604 or blocks 604 and 612 can be other sequenced, combined, or further subdivided. The controller 256 can be configured to control a thrust response of the gas turbine engine 20 to a response profile 408 based on the throttle lever angle 410 using any combination of the low spool motor 12A, high spool motor 12B, and fuel burn.

In some embodiments, a low spool generator 213A is configured to extract power from the low speed spool 30, and a high spool generator 213B is configured to extract power from the high speed spool 32. The controller 256 can be configured to selectively provide electrical power from the low spool generator 213A to the high spool motor 12B and selectively provide electrical power from the high spool generator 213B to the low spool motor 12A. The controller 256 can also be configured to selectively engage either or both of the low spool generator 213A and the high spool generator 213B to adjust a load and speed of either or both of the low speed spool 30 and the high speed spool 32.

While the above description has described the flow process of FIG. 6 in a particular order, it should be appreciated that unless otherwise specifically required in the attached claims that the ordering of the steps may be varied. Also, it is clear to one of ordinary skill in the art that, the starting control described herein can be combined with and enhance other control features, such as valves, vanes, and fuel flow control.

Although some embodiments described herein relate to relighting an engine during or after an e-taxi event, it should be appreciated that the disclosed techniques for relighting an engine can also apply to other modes of operation and/or flight phases. For example, a mode of operation of the gas turbine engine 20 of FIGS. 1 and 2, such as idle, takeoff, climb, cruise, and descent can have different power settings, thrust requirements, flow requirements, and temperature effects.

An aircraft can selectively power a hybrid electric engine by providing electric power from various sources, such as a battery system, another engine, and/or an APU or secondary power unit (SPU). With respect to the aircraft 10 of FIG. 1, the hybrid electric propulsion systems 100A, 100B can be independently controlled such that one of the hybrid electric propulsion systems 100A, 100B is operating in a fuel burning mode while the other of the hybrid electric propulsion systems 100A, 100B is operated using the low spool motor 12A and/or the high spool motor 12B or a blend of fuel burn and electric power. Such mixed modes of operation may be used, for instance, during descent of the aircraft 10, where thrust is desired from both gas turbine engines 20, but only one of the gas turbine engines 20 actively burns fuel. In such cases, it may be desirable, during descent, to restart (e.g., relight) the one of the gas turbine engines 20 that is not actively burning fuel.

During descent with one of the engines 20 operating on electric power and the other of the engines 20 operating with fuel burn, various aspects may be considered such that the engine system operates efficiently, and the one of the engines 20 operating on electric power can rapidly resume a fuel-burn mode of operation (e.g., restart or relight). However, in some cases, it may be desirable, during descent, to keep only one of the gas turbine engines 20 actively burning fuel while the other of the gas turbine engines 20 is operating on electric power. The choice of whether to use only one of the gas turbine engines 20 in fuel burning mode or to use both of the gas turbine engines 20 in fuel burning mode can depend, for example, on the descent angle (e.g., glide slope).

One or more embodiments described herein provides a process for determining when to enable a hybrid electric engine to operate in a fuel burning mode or to operate in an electrically powered mode during descent. For example, in some situations such as e-taxi or descent, an aircraft having two hybrid electric engines can operate with one of the engines in fuel-burning mode and the other engine operating in an electric power (non-fuel burning) mode. This can be referred to as single-engine descent when the aircraft is in a descent phase of flight.

During single engine descent, thrust matching is performed. For example, 1000 pounds of thrust per each of the engines 20 can be achieved by driving a fan of one of the engines 20 electrically to provide 1000 pounds of thrust, and the other of the engines 20, operating in a fuel-burning mode, can generate power for the electrically-operated engine and produce 1000 pounds of thrust.

In some cases, in some cases of descent, such as with a relatively shallower glide slope, it is more fuel efficient to operate both engines 20 in the fuel-burning mode. However, in cases with a relatively steeper glide slope, it is more fuel efficient to maintain a single engine descent (e.g., to operate only one of the engines 20 in the fuel-burning mode while the other engine 20 operates in the electrically powered mode).

A control strategy implemented by the hybrid electric engine system can consider a planned descent profile (e.g., a desired glide slope), a battery state of charge, and/or an estimate of transmission losses to decide whether to exercise this function of single engine descent. Other parameters may also be considered and can include, for example, the availability of power from an APU/SPU as a primary or backup power source for the electrically operated engine.

With a steep approach or continuous approach, it may make more sense to operate in single engine descent mode, which supports a steeper approach than a traditional duel fuel-driven engine approach. Glide range to alternate landing locations may also be considered as an input to activating single engine descent mode. For example, if the glide range to an alternate landing location is determined to exceed a distance threshold, the mode of the electrically powered engine can be changed to the fuel-burning mode. As an example, the distance threshold could be present, could be based on factors such as fuel burn rate, available fuel, environmental factors, pilot input, and the like, including combinations thereof.

According to one or more embodiments described herein, a tradeoff of expected fuel savings versus component wear effects can be determined prior to activating single engine descent mode. For example, where fuel savings is greater than any negative effects on component wear, it may be desirable to use single engine descent. However, where negative effects on component wear is greater, it may be desirable to use a traditional duel fuel-driven engine approach. Flight time with single engine descent mode active can be tracked for each engine as well as whether each engine operated as a fuel-driven engine or an electrically operated engine during single engine descent mode. This information can be used to determine lifetime estimates for engines/components.

Figure 7:
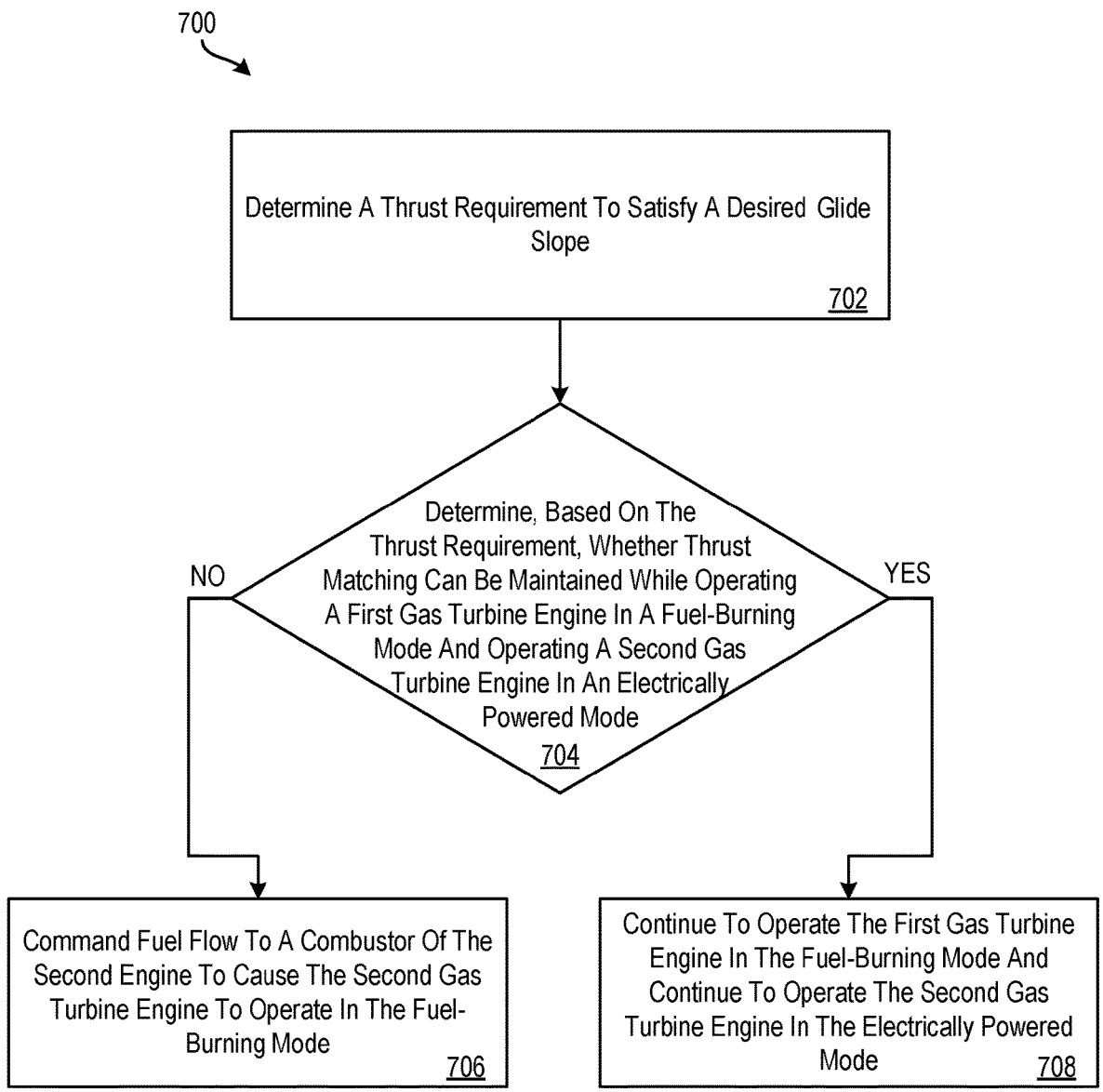
FIG. 7 is a flow chart illustrating a method, in accordance with an embodiment of the disclosure.

FIG. 7 is a flow chart illustrating a method 700, in accordance with an embodiment of the disclosure. The method 700 can be performed by any suitable system, device, controller, etc., such as the controller 256. It should be appreciated that system, device, controller, etc., that performs the method can be located in a control unit of one of the engines 20, both of the engines 20, the aircraft 10, combinations thereof, or at another location.

At block 702, a controller (e.g., the controller 256) determines a thrust requirement to satisfy a desired glide slope. The desired slope can be received, for example, from a system/controller of the aircraft, from the pilot, from a remote ground-based system, and/or the like. The desired glide slope indicates a desired path of descent of the aircraft preparing to land. Some landing locations (e.g., airports) require relatively higher glide slopes than other landing locations due to geographic conditions, environmental conditions, local regulations, etc. Further, some aircraft operate more efficiently at certain glide slopes than others.

At decision block 704, the controller determines, based on the thrust requirement, whether thrust matching can be maintained while operating a first gas turbine engine (e.g., one of the engines 20) in a fuel-burning mode and operating a second gas turbine engine (e.g., the other of the engines 20) in an electrically powered mode. As described herein, during single engine descent, thrust matching is performed. For example, 1000 pounds of thrust per each of the engines 20 can be achieved by driving a fan of one of the engines 20 electrically to provide 1000 pounds of thrust, and the other of the engines 20, operating in a fuel-burning mode, can generate power for the electrically-operated engine and produce 1000 pounds of thrust. The controller determines whether the thrust matching can be maintained while the aircraft operates in single engine descent. Determining whether thrust matching can be maintained can include comparing a first thrust of the first engine with a second thrust of the second engine. It is determined that thrust matching can be maintained when the second thrust satisfies a threshold difference relative to the first thrust. However, it is determined that thrust matching cannot be maintained when the second thrust fails to satisfy a threshold difference relative to the first thrust. The threshold difference could be a percent difference between the first and second thrusts (e.g., 2% difference), an absolute value difference between the first and second thrusts (e.g., 10 pounds of thrust difference), and/or the like.

If, at decision block 704, it is determined that thrust matching cannot be maintained, the controller, at block 706, commands fuel flow to a combustor of the second engine to cause the second gas turbine engine to operate in the fuel-burning mode. That is, the second engine ceases to operate in the electrically powered mode and switches to fuel-burning mode, thus providing the aircraft with dual engine descent. This ensures that the thrust matching can be maintained while maintaining the desired glide slope.

If, at decision block 704, it is determined that thrust matching can be maintained, at block 708, the first gas turbine engine continues to operate in the fuel-burning mode and the second gas turbine engine continues to operate in the electrically powered mode.

Additional processes also may be included. For example, the method 700 can include determining a glide range to an alternate landing location and then, responsive to determining that the glide range exceeds a distance threshold, commanding fuel flow to a combustor of the second engine to cause the second gas turbine engine to operate in the fuel-burning mode.

According to one or more embodiments described herein, the method 700 includes tracking a first amount of time the second engine spends in the fuel-burning mode and a second amount of time the second engine spends in the electrically powered mode. The commanding can then be based on the first and/or second amount of time. For example, commanding the fuel flow to the combustor of the second engine to cause the second gas turbine engine to operate in the fuel-burning mode is based at least in part on at least one of the first amount of time or the second amount of time.

It should be understood that the process depicted in FIG. 7 represents an illustration, and that other processes may be added or existing processes may be removed, modified, or rearranged without departing from the scope of the present disclosure.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A system comprising:
    a first gas turbine engine of an aircraft, the first gas turbine engine comprising a first low speed spool, a first high speed spool, and a first combustor;
    a first high spool motor configured to augment rotational power of the first high speed spool;
    a second gas turbine engine of the aircraft, the second gas turbine engine comprising a second low speed spool, a second high speed spool, and a second combustor;
    a second high spool motor configured to augment rotational power of the second high speed spool; and
    a controller to:
        determine a thrust requirement to satisfy a desired glide slope;
        determine whether thrust matching between the first gas turbine engine and the second gas turbine engine can be maintained while operating the first gas turbine engine in a fuel-burning mode and operating the second gas turbine engine in an electrically powered mode; and
        responsive to determining that thrust matching cannot be maintained, command fuel flow to the second combustor of the second gas turbine engine to cause the second gas turbine engine to operate in the fuel-burning mode.

2. The system of claim 1, wherein the controller is further configured to:
    determine a glide range to an alternate landing location; and
    responsive to determining that the glide range exceeds a distance threshold, command fuel flow to the second combustor of the second gas turbine engine to cause the second gas turbine engine to operate in the fuel-burning mode.

3. The system of claim 1, wherein the controller is further configured to track a first amount of time the second gas turbine engine spends in the fuel-burning mode and a second amount of time the second gas turbine engine spends in the electrically powered mode.

4. The system of claim 3, wherein commanding the fuel flow to the second combustor of the second gas turbine engine to cause the second gas turbine engine to operate in the fuel-burning mode is based at least in part on at least one of the first amount of time or the second amount of time.

5. The system of claim 1, wherein responsive to determining that thrust matching can be maintained, the first gas turbine engine continues to operate in the fuel-burning mode and the second gas turbine engine continues to operate in the electrically powered mode.

6. The system of claim 1, wherein the controller is further configured to receive the desired glide slope.

7. A method comprising:
    determining a thrust requirement to satisfy a desired glide slope;
    determining, based on the thrust requirement, whether thrust matching between a first gas turbine engine and a second gas turbine engine can be maintained while operating the first gas turbine engine in a fuel-burning mode and operating the second gas turbine engine in an electrically powered mode; and
    responsive to determining that thrust matching cannot be maintained, commanding fuel flow to a combustor of the second gas turbine engine to cause the second gas turbine engine to operate in the fuel-burning mode.

8. The method of claim 7, further comprising:
    determining a glide range to an alternate landing location; and
    responsive to determining that the glide range exceeds a distance threshold, commanding fuel flow to the combustor of the second gas turbine engine to cause the second gas turbine engine to operate in the fuel-burning mode.

9. The method of claim 7, further comprising tracking a first amount of time the second gas turbine engine spends in the fuel-burning mode and a second amount of time the second gas turbine engine spends in the electrically powered mode.

10. The method of claim 9, wherein commanding the fuel flow to the combustor of the second gas turbine engine to cause the second gas turbine engine to operate in the fuel-burning mode is based at least in part on at least one of the first amount of time or the second amount of time.

11. The method of claim 7, further comprising, responsive to determining that thrust matching can be maintained, continuing to operate the first gas turbine engine in the fuel-burning mode and continuing to operate the second gas turbine engine in the electrically powered mode.

12. The method of claim 7, further comprising receiving the desired glide slope.

* * * * *